United States Patent [19]

Canzoneri

[11] Patent Number: 4,782,789

[45] Date of Patent: Nov. 8, 1988

[54] INDUCED STATIC FLOTATION CELL

[75] Inventor: Anthony S. Canzoneri, Kenner, La.

[73] Assignee: L'eau Claire Systems, Inc., Kenner, La.

[21] Appl. No.: 112,397

[22] Filed: Oct. 26, 1987

[51] Int. Cl.[4] .......................................... B01D 17/035
[52] U.S. Cl. .................................... 210/703; 210/744; 210/109; 210/129; 210/221.2; 209/170
[58] Field of Search ............... 209/164, 170, 169, 168; 210/221.2, 221.1, 703, 744, 109, 129

[56] References Cited

U.S. PATENT DOCUMENTS

| | | | |
|---|---|---|---|
| 1,440,129 | 12/1922 | Borchardt | 209/170 |
| 2,753,045 | 7/1956 | Hollingsworth | 210/221.2 |
| 4,564,457 | 1/1986 | Cairo | 210/704 |
| 4,618,430 | 11/1986 | Favret | 210/221.2 |

FOREIGN PATENT DOCUMENTS

| | | | |
|---|---|---|---|
| 411907 | 3/1972 | U.S.S.R. | 209/169 |
| 1122365 | 11/1984 | U.S.S.R. | 209/168 |

Primary Examiner—David I. Lacey
Assistant Examiner—Thomas M. Lithgow
Attorney, Agent, or Firm—Keaty & Keaty

[57] ABSTRACT

An induced static flotation (ISF) cell has an inlet chamber, a plurality of gasification chambers, and an outlet chamber. Contaminated liquid enters the inlet chamber, passes through the gasification chambers, and exits through the outlet chamber. Gas bubbles are introduced into the bottom of each gasification chamber and attract suspended contaminants and/or oil as they rise. A contaminant-laden froth forms at the top of the cell, and is removed via a first skim trough which extends through the gasification chambers into the inlet chamber, and via a second skim trough in the outlet chamber. A liquid level displacement controller maintains the level of fluid in the gasification chambers adjacent and below the top of the first skim trough, the second skim trough being vertically adjustable to account for the difference in specific gravity between the liquid in the outlet chamber and the gasification chambers. A timer pulsing device raises the level periodically to provide additional skimming. Gas is recirculated from the top of the cell for introduction into the bottom of the gasification chambers.

Secondary baffles in the gasification chambers prevent a bypass by the liquid and gas of the turbulent area created by the gas flow above the eductor assemblies which deliver the gas into gasification chambers. By using a pair of baffles in the outlet chamber, the fluid retention time is increased to further improve the liquid/contaminants separation.

18 Claims, 3 Drawing Sheets

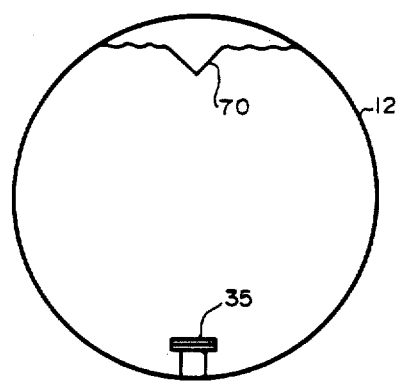
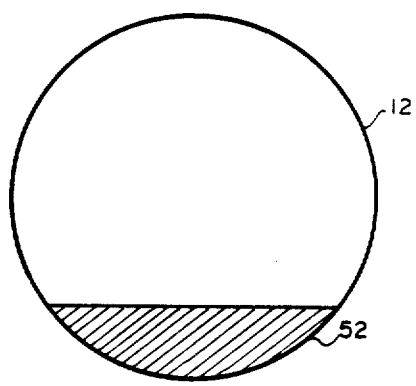
FIG. 2            FIG. 3
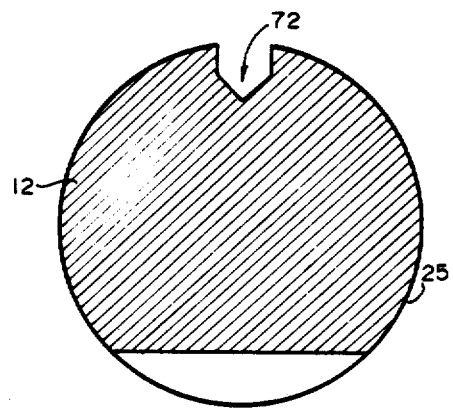
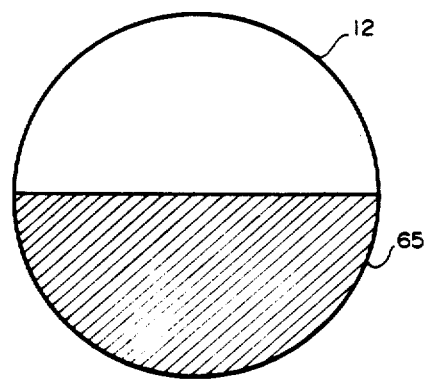
FIG. 4            FIG. 5
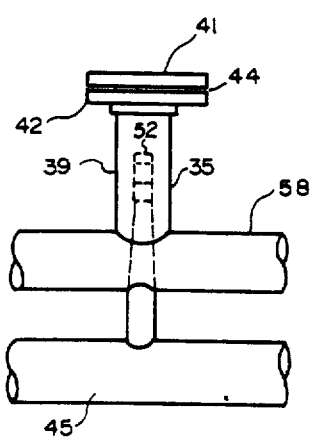
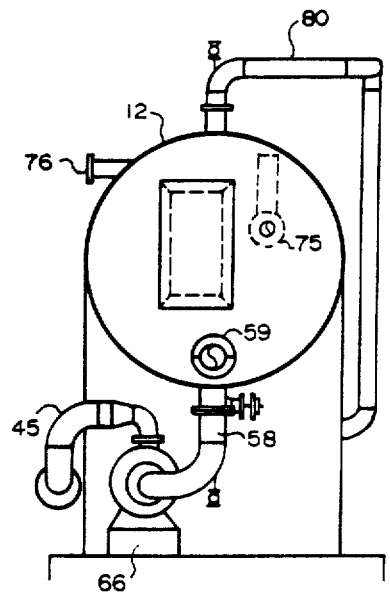
FIG. 6            FIG. 7

INDUCED STATIC FLOTATION CELL

BACKGROUND OF THE INVENTION

1. Field of the Invention

The present invention relates to a method and apparatus for removing suspended matter from liquid. The method and apparatus of the present invention have utility, for example, in separating suspended contaminants and/or oil from water.

2. Description of the Related Art

In many industries, including oil, paper and pulp, textile, electricity generating and food processing, there is an ever-present problem of contaminated water as a by-product of various processes. In particular, water is often used to aid in the production of oil and gas on offshore platforms. This water is usually pumped into a formation in order to be able to pump oil out. As a result, the water becomes contaminated with oil and solids encountered in the formation, and therefore cannot be disposed of simply by dumping it into the surrounding water. Accordingly, numerous methods and systems have been devised to reduce the contaminant content in this water to a level which allows discharge of the water into the sea.

One such system, disclosed in U.S. Pat. No. 4,255,262, comprises a device which mixes and disperses gas in the form of fine bubbles in liquid in a tank in an attempt to remove contaminants from the liquid flowing through the tank. The gas is induced from the upper section of the tank downward into the liquid in the tank via a draft tube. The gas induction occurs as a portion of the liquid contained in the vessel is recirculated back through the individual cells or compartments using a centrifugal pump. The apparatus uses an electrically-driven mechanical skimmer assembly, which serves to remove contaminant-laden froth which accumulates above the liquid level section of the tank. The tank is rectangular-shaped.

The above-mentioned device suffers from various drawbacks. The skimmers are moderate-to high-maintenance items, particularly when used in corrosive environments such as may be encountered in the oil-producing and chemical industries. Also, the rectangular tanks, by virtue of their construction, cannot withstand pressures in excess of 2 oz. per square inch internal. This is particularly disadvantageous especially where system pressure upstream of the oil/water separator are prevalent or where noxious or lethal gases such as hydrogen sulfide are present. Furthermore, the rectangular tanks having the skimmers are limited in volumetric capacity because full utilization of the tank is not allowed. In addition, although these tanks are described as "gas tight", gas pressures are maintained by continuously venting gas to the atmosphere, which is a potentially dangerous practice if lethal or flammable gases are present.

U.S. Pat. No. 4,564,457, assigned to the assignee of the present application, discloses another system for separating suspended matter from fluid. The device comprises a cylindrical tank having an inlet chamber, a plurality of gasification chambers, and a quiescent outlet chamber. A skim trough is disposed near the top of the tank, and extends the length of the gasification chambers into the outlet chamber. Vertical baffles which separate the individual chambers extend downwardly and are spaced from the bottom of the tank, allowing fluid to flow along the bottom of the tank from the inlet chamber to the outlet chamber. Each gasification chamber is equipped with an eductor nozzle assembly positioned centrally in the lower portion thereof. The nozzle assembly provides for recirculation of fluid pumped from the outlet chamber.

In operation, fluid enters the tank through the inlet chamber, passes successively through each of the gasification chambers, and into the outlet chamber, where a portion of the fluid is drawn off to be recirculated through the eductor nozzles. The balance of the processed fluid exits the outlet chamber for further treatment, discharge or storage, depending upon the application. The recirculated fluid is pumped through the nozzle assembly, each nozzle being fed by a common header supplied by a recirculation pump, and each nozzle being positioned co-centrically in an eductor throat assembly. Each eductor throat assembly is connected to a gas header, supplied by a gas volume in the upper portion of the tank common to the aeration chambers and the outlet chamber. The passage of the fluid at high velocity through the nozzles educts gas into the gasification chambers and the gas rises in the fluid in the form of small bubbles. The gas bubbles collect oil and/or suspended solid contaminants as they rise, forming a contaminant-laden froth at the top of the gasification chambers.

While this device presents definite advantages over that disclosed in U.S. Pat. No. 4,255,262, such as the elimination of the mechanical skimmer and problems associated therewith, the ability to operate at higher internal pressure, and better utilization of available tank volume, it suffers from some disadvantages. For example, flow out of the tank must be interrupted in order to remove the contaminant-laden froth from the tank. This can be disadvantageous when a continuous flow of fluid is desirable. Also, the skim trough extends through the gasification chambers into the outlet chamber, which permits froth to spill into the quiescent outlet chamber and contaminate the effluent. Furthermore, there is no means for removing contaminants which may accumulate at the top of the inlet chamber, and no means for venting gas, which may have been entrained in the influent, which accumulates in the inlet chamber. In addition, there is no means for retaining gas in the vessel when the skim outlet valve is opened, creating a potentially dangerous situation if noxious, lethal or flammable gases are present in the tank.

Another problem which is often encountered with the baffles terminating a distance above the tank bottom is that some portion of influent tends to pass under the baffles without being directed to a high turbulence area and contacted by gas bubbles.

Additionally, the velocity of flow in the degasification chamber is relatively high, which leads to insufficient final oil/water separation.

SUMMARY OF THE INVENTION

The apparatus and method of the present invention provide a system which overcomes the disadvantages of the above-mentioned systems. The present invention provides an Induced Static Flotation (ISF) cell comprising a cylindrical tank having an inlet chamber, a plurality of gasification chambers, and an outlet chamber. The chambers are created by a plurality of primary baffles extending from the top of the vessel to a distance above the vessel bottom. Liquid enters the inlet chamber, flows through the gasification chambers, then flows out to the tank through the outlet chamber. Each gasification chamber comprises a means for introducing gas bubbles into the chamber. Suspended matter and/or oil in the liquid adheres to the gas bubbles as the bubbles rise to the top of the gasification chambers, the bubbles with matter adhered thereto forming a froth at the top of each gasification chamber. A first skim trough disposed near the top of the tank extends the length of the gasification chambers into the inlet chamber. This skim trough continuously receives froth from the gasification chambers, due to a liquid level controller positioned in the inactive inlet chamber which maintains the level of the liquid in the gasification chambers substantially at the level of the top of the trough. This allows the flow through the tank to be continuous, obviating the need to interrupt the flow of liquid in order to collect the froth in the skim trough. The trough also receives matter which may accumulate at the top of the inlet chamber. An opening is provided, in each of the partitions separating the gasification chambers from one another and from the inlet chamber, above the skim trough, allowing gaseous communication between the chambers and allowing gas to be vented from the inlet chamber to the gasification chambers. A second skim trough is present in the outlet degasification chamber for collecting froth which may accumulate at the top of the chamber; the second skim trough is vertically adjustable to account for the difference in specific gravity between the liquid in the outlet chamber and that in the gasification chambers. This provision of a separate trough in the outlet chamber eliminates the possibility of froth from the gasification chambers spilling into the outlet chamber. Gas is recirculated from the top of the tank to the means for introducing gas bubbles into the gasification chambers.

A plurality of secondary baffles are attached to the tank bottom adjacent the primary baffles extending vertically upwardly over the distance between the vessel bottom and the lowermost ends of the primary baffles in order to reduce the tendency of gas and water to bypass high turbulence areas.

In order to improve degasification efficiency and increase the retention time of the liquid in the degasification chamber, this chamber is increased in volume in comparison with gasification chambers.

Additionally, a means to reduce velocity of flow in the degasification chamber are mounted in the chamber in order to further increase the retention time which allows better final oil/water separation and more efficient skimming.

It is therefore an object of the present invention to provide an improved method and apparatus for removing suspended matter and/or oil from liquid utilizing induced static flotation.

Another object of the present invention is to provide a method and apparatus for providing an accurately controlled level in the vessel, thus giving better control of skim.

It is also an object of the present invention to provide an ISF cell in which matter which accumulates at the top of the inlet chamber may be removed automatically therefrom.

A further object of the present invention is to provide an ISF cell in which gas which accumulates in the inlet chamber thereof is vented into the gasification chambers thereof.

The provision of an ISF cell in which froth from the gasification chambers therein is prevented from spilling into the outlet chamber is another object of the present invention.

A still further object of the present invention is to provide a ISF apparatus having means to prevent bypass by the treated fluid of high turbulence area in the gasification chambers.

A further object of the present invention is to provide an ISF cell having means to increase retention time of the treated fluid in the degasification chamber thus allowing improved final oil/water separation.

BRIEF DESCRIPTION OF THE DRAWINGS

For further understanding of the nature, objects and advantages of the present invention, reference should be had to the following detailed description, taken in conjunction with the accompanying drawings, in which like parts are given like reference numerals, and wherein:

FIGS. 2–5 are cross-sectional views, taken along the lines 2—2 through 5—5, respectively, of the apparatus shown in FIG. 1.

FIG. 6 is a side view of a gas eductor assembly used in the preferred embodiment of the present invention.

FIG. 7 is an end view of the apparatus shown in FIG. 1.

DETAILED DESCRIPTION OF THE PREFERRED EMBODIMENT

The present invention will now be described, by way of example, and not limitation, with the influent being water contaminated with oil and other suspended particulates. It is to be understood that the present invention has utility in numerous applications in which it is desirable to separate suspended matter and/or oil from a liquid, and that the suspended matter, the liquid, or both may be the desired product of the process.

Figure 1:
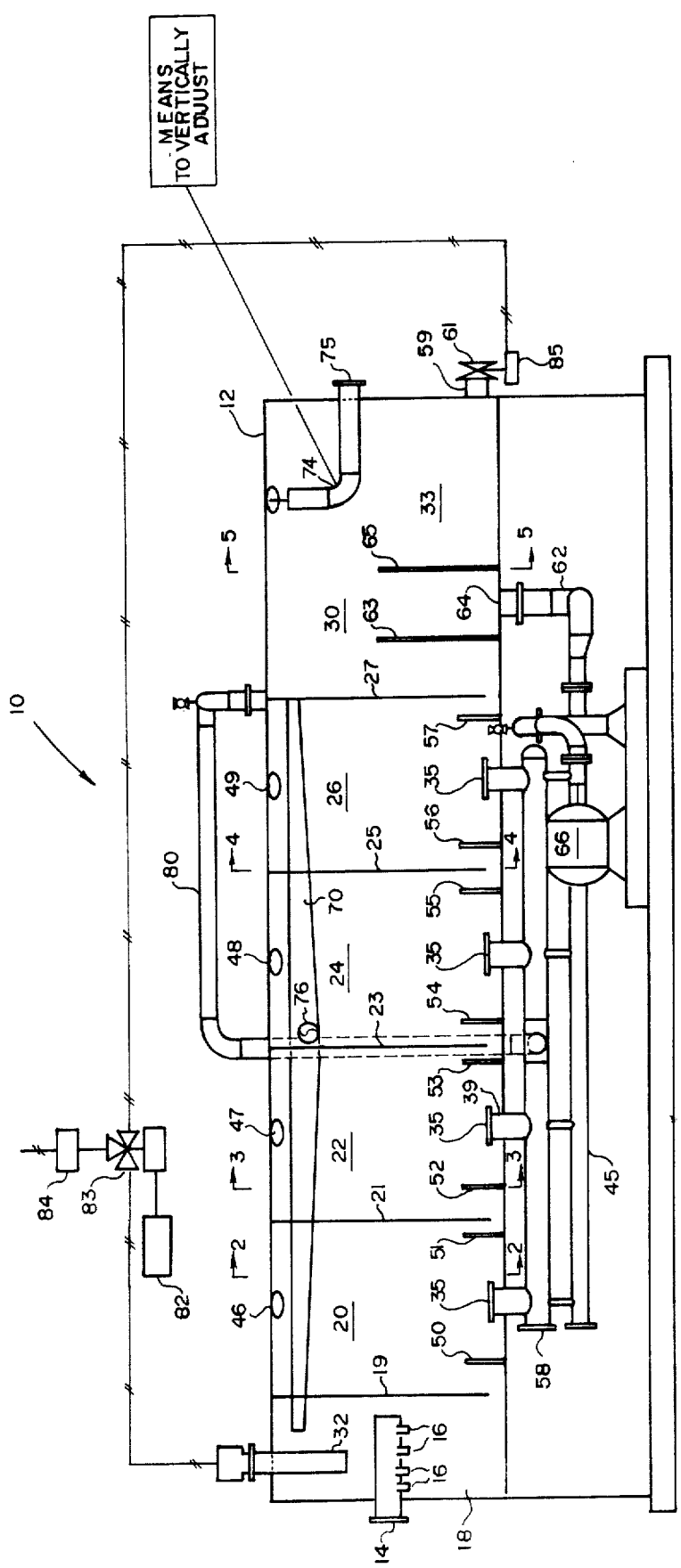
FIG. 1 is a schematic view of the preferred embodiment of the apparatus of the present invention.
Figure 8:
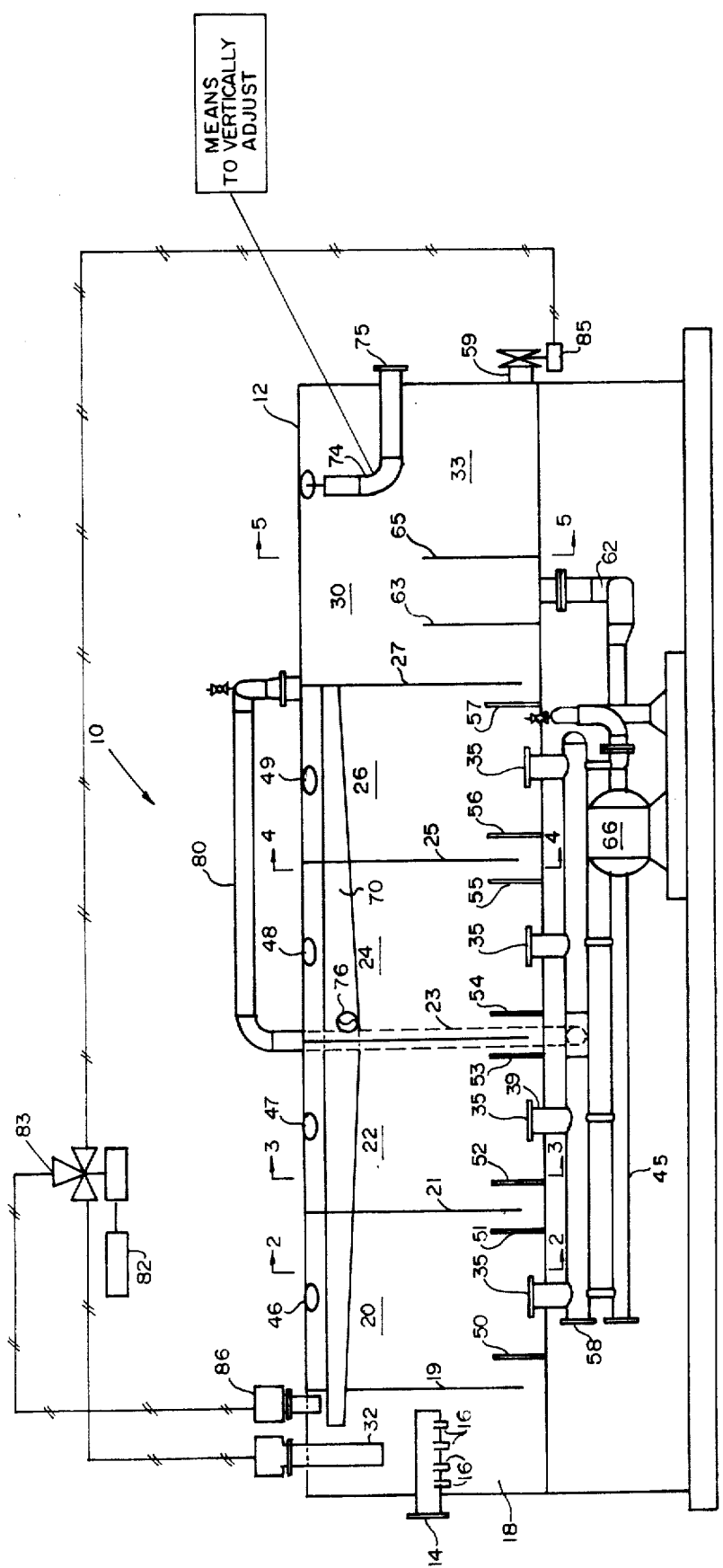
FIG. 8 is a schematic view of the apparatus of the present invention illustrating an alternative level control means.

The preferred embodiment of the apparatus of the present invention comprises an induced static flotation system illustrated in FIGS. 1 and 5, with details of components thereof shown in the FIGS. 2–6.

Referring now to FIG. 1, the system 10 of the apparatus of the preferred embodiment of the present invention comprises induced static flotation tank 12 having a continuous cylindrical sidewall and is capable of withstanding substantial internal pressures such as may be encountered when processing produced water from an oil well. Tank 12 is divided into an inlet chamber 18, a plurality of gasification chambers 20, 22, 24, 26 and an outlet chamber 30 by a plurality of vertical partitions 19, 21, 23, 25 and 27. The partitions extend from the top of tank 12 downward, and are spaced from the bottom of tank 12 to allow fluid communication between the chambers. The length of the partitions is calculated to minimize the effect of pressure differential due to difference in flow rates under each partition. An inlet line 14 is provided to allow influent to enter tank 12, the internal part of the inlet line 14 having downwardly facing nozzles (holes) 16, which serve to direct flow of the influent downward. Effluent flows out of tank 12 via exit line 59. The treated effluent then passes through line 59 while a portion flows through line 62 to pump 66 for recirculation in the system, as will be described further.

Each gasification chamber has a means centrally located in the bottom therein for dispersing gas bubbles into the water which, in the preferred embodiment, comprises gas eductor assembly 35, details of which can be more clearly seen in FIG. 6. Each gas eductor assembly 35 (see FIG. 6) comprises a gas flow conduit 39 which projects through the bottom of the gasification chamber. Gas flow conduit 39 terminates in a top shoulder portion 42, to which is fixedly attached a striker plate 41, defining a gas flow space 44 between striker plate 41 and shoulder portion 42. A secondary fluid flow line 45 serves as an effluent recirculation line. Fluid flow line 45 terminates in a nozzle 52. Each gas flow conduit 39 (see FIG. 1) is connected to main gas flow conduit 58, which is also fluidly connected to a gas recirculation line 80 leading from the top of the gasification chamber 26 and outlet chamber 30. Gas recirculation line 80 communicates with the mid portion of the conduit 58 to improve gas distribution. Pump 66 serves to pressurize the effluent causing a pressurized flow of fluid out of fluid flow line 45 (FIG. 6) through nozzle 52, which educts gas contained in gas flow conduit 39 through gas flow space 44 into the gasification chamber. This eduction of gas due to the fluid flowing out of nozzle 52 causes the gas to continuously circulate from the upper region of tank 12 to gas flow conduit 39, via conduits 58 and 80.

A plurality of upwardly extending baffle plates are attached to the bottom of the vessel 12.

Baffle 50 is positioned immediately after the partition 19 so as to place the incoming flow in a high velocity area and promote mixing. This also helps to reduce water bypassing along the floor of the vessel 12.

Baffles 51 and 52 are positioned in front of and behind the partition 21 so as to reduce undesirable gas bypass from chamber 20 to the chamber 22.

Similar baffles 53, 54 and 55, 56 are mounted in cooperation with the partitions 23 and 25, respectively.

Only one baffle 57 is positioned in front of the last partition 27.

It should be noted that while the length of partitions 19–27 is designed to minimize effect of pressure differential due to differences in flow under each partition, the height of the baffles 50–57 is such as to exceed the vertical size of the space between the lower edges of the partitions 19, 21, 23, 25 and 27 and the bottom of the vessel 12.

A primary skim trough 70 having a closed bottom, closed sides, closed ends, and an open top (best seen in FIGS. 1 and 2), extends the length of gasification chambers 20, 22, 24 and 26, through partitions 19, 21, 23 and 25 into inlet chamber 18. Skim trough 70 receives contaminant-laden froth produced in the gasification chambers, as well as contaminants which accumulate in the upper region of inlet chamber 18 and is removed from the trough 70 through a primary skim outlet 76. The trough 70 is tapered on the bottom to permit a better removal of skimmings from the trough 70. An open space 72 (FIG. 3) is provided above skim trough 70 in partitions 19, 21, 23 and 25 to allow gaseous communication between each of the gasification chambers and the inlet chamber. The upper portion of partition 27 is void of openings to prevent froth from spilling from skim trough 70 into outlet chamber 30.

A secondary skim trough 74 having a closed bottom, closed sides, closed ends and an open top (FIG. 1), is disposed in outlet chamber 30. The secondary skim collection means 74 is positioned at a level above the line 59 and has a horizontal portion extending into the interior of the outlet chamber 30 for a distance within the quiescent zone 33. The trough 74 is further provided with an upwardly extending portion, the distant end of which is open in order to collect the froth accumulated in the chamber 30. The trough can be moved upwardly or downwardly within the chamber 30. The vertical adjustment can be accomplished by manual operation. The particular details of this feature are not shown but are well within the knowledge of those skilled in the art. Secondary skim trough 74 is vertically adjustable to account for the difference in specific gravity of the fluid in the gasification chambers and the fluid in the outlet chamber, due to the presence of gas bubbles in the former.

A liquid level control means in the form of a displacement level controller 32 is positioned in the inlet chamber 18 since this chamber has little, if any, turbulence and is inactive, which ensures a more stable control and permits a more accurate pre-determination of the liquid level within the vessel 12. Normally, the liquid level controller 32 controls level so that only froth passes over the edge of the trough 70 by controlling an outlet valve 61. An adjustable timer 82 connected to a three-way valve 83 transfers control from the level controller 32 to a regulated source of gas 84 which closes the outlet valve 61 through actuator 85 to a pre-determined position while not interrupting the effluent flow. This raises the liquid level in the vessel 12 so that all surface froth and a small amount of liquid is skimmed.

An alternate liquid level control means can be a second level controller 86 mounted in lieu of the regulated gas supply. This second level controller 86 can be set at a level slightly above the edge of the skim trough 70. An adjustable automatic timer 82 is operationally connected to the displacement level controller 32 and level controller 86 which permits skimming of froth intermittently at a pre-determined adjustable rate.

A pair of baffles 63 and 65 (shown in detail in FIG. 5) are fixedly attached to the bottom of the vessel 12 and extend upwardly adjacent outlet 64 of the recirculation line 62. This allows the recirculating fluid to be channeled into the outlet 64. The velocity of the flow sharply reduces after the flow passes the baffle 65. In this manner, the fluid is allowed extra retention time within the chamber 30 which not only helps to improve the final oil/water separation and more effective skimming but also permits a greater gas removal efficiency.

As can be seen in FIG. 1, the volume of the chamber 30 is greater than the volume of the gasification chambers 20, 22, 24 and 26. It allows to increase the time the fluid is retained in the degasification chamber 30 and creates a better gas/liquid separation.

As was discovered during numerous experiments with the apparatus of the present invention, the space along the bottom of the vessel 12 enjoys very little turbulency and some part of the influent in the gasification chambers 20–26 tends to bypass mixing with gas coming from the eductor assemblies 35.

In order to direct all influent into high turbulence areas within the chambers 20–26, a number of secondary baffles 50, 51, 52, 53, 54, 55, 56 and 57 are mounted adjacent the partitions 19, 21, 23, 25 and 27.

The secondary baffles are spaced from the partitions 19, 21, 23, 25 and 27 and extend upwardly to a distance so that their uppermost ends are above the lowermost ends of the partitions 19–21, 23, 25 and 27 to create an additional obstacle on the flow path and direct the influent into a high turbulence area above the eductor assemblies 35.

No secondary baffles are positioned in the inlet chamber 18 and the degasification chamber 30.

An additional advantage of the secondary baffles is that the gas introduced through the eductor assemblies 35 is not allowed to bypass the mixing area of one gasification chamber and move to another degasification chamber without mixing with the influent.

An optional chemical feed unit (not shown), which is a standard feed unit for feeding a metered amount of a flocculant chemical usually a polymer or a demulsifier, into flow line 14, to initially treat the influent for achieving optimum separation of contaminants from the water can be provided.

Although not shown, valves are provided for blowdown of sludge which collects in the bottom of tank 12. Also not shown are optional gauges to monitor the pressure of the recirculated effluent and the flow of gas through flow conduit 80.

A novel method of level control is employed in the system of the present invention.

The inlet chamber 18 has practically no turbulence and is inactive. A level control means in the form of a displacer is positioned in the chamber 18 to allow for a more accurate level control pre-determination. This also permits skimming intermittently at a pre-determined adjustable rate.

In operation, water contaminated with oil and suspended particulates enters tank 12 through inlet line 14, and is directed downward into inlet chamber 18 through holes 16. Optionally, a flocculant chemical or a demulsifier contained in feed unit may be added to the water in flow line 14 to initially treat the water to achieve optimum separation of the contaminants from the water. Any gas which may be entrained in the water flows through open space 72 (FIG. 4) in partition 19, into the upper region of the gasification chambers. Contaminants which accumulate at the top of inlet chamber 18 flow into primary skim trough 70.

The water then flows through the gasification chambers 20, 22, 24 and 26, where gas bubbles are educted into the water by means of gas eductor assemblies 35. As these gas bubbles rise through the water, they attract oil and other contaminants suspended in the water through induced static flotation, and a contaminant-laden froth forms at the top of the gasification chambers. Fluid level controller in inlet chamber 18 regulates the level of the water in the gasification chambers. When the level of water in the gasification chambers falls below the pre-determined level, an outlet valve modulates the flow of water therethrough, adjusting the level of the water in the gasification chambers until it reaches the necessary level. This level controller keeps the water in the gasification chambers at a level just below the top of primary skim trough 70, which ensures that the contaminant-laden froth, but not the water, will accumulate in skim trough 70. Gas, which is liberated from the contaminants in the upper region of the gasification chambers, is recirculated through open spaces 72 in partitions 21, 23 and 25, via conduit 80 (FIG. 1) and main gas flow conduit 58 to gas flow conduits 39, where it is again educted through gas eductor assemblies 35 into the water in the gasification chambers.

The water, which at this time is substantially free of contaminants, then flows into outlet chamber 30. Baffle 63 directs the flow of water upward before it enters quiescent zone 33, so that free gas which may migrate into outlet chamber 30 from chamber 26 is allowed to exit tank 12 via exit line 59. Otherwise, these bubbles could cause cavitation of recirculation pump 66 during recirculation of the effluent. These bubbles instead rise to the top of the water in the outlet chamber. Any froth which may accumulate at the top of the water in outlet chamber 30 collects in secondary skim trough 74, which is automatically vertically adjusted.

The water, which is now substantially free of contaminants and gas, exits quiescent zone 33 through exit line 59. A portion of the treated water is recirculated through line 62 to be pressurized by pump 66 for use in the gas eductor assemblies 35.

Inspection openings 46, 47, 48 and 49 are made at the top of the tank 12 to allow visual observation of the chambers 20, 22, 24 and 26, respectively.

While a single preferred embodiment of the present invention has been described herein, it is to understood that various modifications can be made thereto without departing from the spirit or scope of the present invention; for example, the means for introducing gas bubbles into the gasification chambers could comprise a blower within conduit 58 or a gas compressor which would force gas from conduit 58 through gas flow conduit 39. I therefore pray that my rights to the present invention be limited only by the following claims.

I claim:

1. An apparatus for removing suspended matter from a liquid, comprising:
   a substantially cylindrical, gas-tight vessel for receiving a flow of liquid having suspended matter therein;
   a plurality of partitions sequentially dividing the vessel into an inlet chamber, at least one gasification chamber and an outlet chamber, each of said chambers fluidly communicating with one another;
   means for introducing the flow of liquid into the inlet chamber;
   means for introducing a flow of gas into the at least one gasification chamber for creating a turbulent area and attracting the suspended matter and for carrying the suspended matter to an upper portion of the vessel;
   a primary skim collection channel extending from the inlet chamber and terminating in the at least one gasification chamber located adjacent the outlet chamber for collecting the suspended matter in the upper portion of the vessel;
   a secondary skim collection channel, independent of said primary channel, is located in the upper portion of the outlet chamber for collecting the suspended matter in an upper portion of the outlet chamber, means to vertically adjust said secondary skim collection channel;
   means for delivering the collected suspended matter outside of the vessel;
   means for removing clarified liquid from said outlet chamber; and
   means for preventing a bypass by the gas and liquid of the turbulence area created by the flow of gas.

2. The apparatus of claim 1, further comprising means for controlling the liquid level in the vessel mounted in the inlet chamber.

3. The apparatus of claim 1, further comprising means for reducing velocity of a fluid flow in the outlet chamber, said means comprising a pair of spaced-apart baffle means extending upwardly from a bottom of the vessel, and a means for recirculating a portion of the clarified liquid having an inlet which communicates with the outlet chamber, wherein said inlet is positioned between said spaced-apart baffle means.

4. The apparatus of claim 1, wherein said means for preventing a bypass of the turbulent area comprises secondary baffles extending from a bottom of the vessel upwardly, a distance above lowermost ends of the partitions dividing the vessel, said secondary baffles being mounted adjacent said partitions in the gasification chamber.

5. The apparatus of claim 1, further comprising means for recirculating gas introduced into the vessel.

6. The apparatus of claim 1, wherein said means for introducing the flow of liquid comprises a conduit leading into the inlet chamber, said conduit being provided with downwardly facing apertures for directing the liquid flow downwardly.

7. The apparatus of claim 2, wherein said liquid level control means comprises a displacement-type level controller.

8. The apparatus of claim 7, further comprising means for controlling skimming of the suspended matter intermittently at a pre-determined adjustable rate.

9. The apparatus of claim 8, wherein said means for controlling skimming at a pre-determined adjustable rate comprise an adjustable automatic timer operatively connected to said liquid level control means.

10. An apparatus for removing suspended matter from a liquid, comprising:
  a substantially cylindrical, gas-tight vessel for receiving a flow of liquid having suspended matter therein;
  a plurality of partitions dividing the vessel into an inlet chamber, at least one gasification chamber and an outlet chamber, each of said chambers fluidly communicating with one another;
  means for introducing the flow of liquid into the inlet chamber, said means comprising a conduit having downwardly facing apertures therein;
  means for introducing a flow of gas into the at least one gasification chamber for creating a turbulent area within the at least one gasification chamber and attracting the suspended matter for carrying it to an upper portion of the vessel, said gas introducing means comprising an eductor assembly;
  a primary skim collection channel extending through the at least one gasification chamber and into the inlet chamber for collecting the suspended matter in the upper portion of the vessel, said primary skim collection channel being substantially V-shaped;
  a secondary skim collection channel located in said outlet chamber for collecting the particulate matter from an upper portion of the outlet chamber;
  means for vertically adjusting said secondary skim collection channel;
  means for delivering the collected suspended matter outside of the vessel;
  means for removing a clarified liquid from said outlet chamber;
  means for recirculating a portion of the clarified liquid;
  means for preventing a bypass by the gas and liquid of the turbulence area created by the flow of gas, said means comprising secondary baffles mounted in the gasification chambers adjacent said partitions and extending from the bottom of the vessel upwardly to a distance above lowermost ends of said partitions;
  means for recirculating the gas introduced into the vessel;
  means for controlling a fluid level in the vessel mounted in the inlet chamber, said means comprising a displacement-type level controller; and
  means for controlling the skimming of the suspended matter intermittently at a pre-determined adjustable rate.

11. A method for clarifying liquid from a particulate matter and/or oil suspended in the liquid, the method comprising the steps of:
  providing a substantially cylindrical, gas-tight vessel, said vessel having partitions that divide the vessel sequentially into an inlet chamber, at least one gasification chamber and an outlet chamber;
  introducing a flow of liquid having suspended matter and/or oil into the inlet chamber;
  introducing a flow of gas into the at least one gasification chamber for creating a turbulent area, allowing the gas to attract the suspended matter and carry it to an upper portion of the vessel;
  providing a first skim collection channel in the upper portion of the vessel extending from the inlet chamber and terminating in the at least one gasification chamber adjacent the outlet chamber; providing a secondary skim collection channel independent of said primary channel, located in the upper portion of the outlet chamber;
  providing means to control the skimming of the collected suspended matter intermittently at a pre-determined adjustable rate;
  providing means in the at least one gasification chamber for directing substantially all fluid flow into the turbulent area;
  removing clarified liquid from the vessel; and
  removing the collected suspended matter from the vessel.

12. The method of claim 11, further comprising the step of providing a vertically adjustable secondary skim collection channel mounted in the outlet chamber for removing the particulate matter from the outlet chamber.

13. The apparatus of claim 12, further comprising the step of providing a means for reducing the velocity of fluid flow within the outlet chamber, said means comprising a pair of spaced-apart baffles extending upwardly from the bottom of the vessel.

14. An apparatus for removing suspended matter from a liquid, comprising:
  a substantially cylindrical, gas-tight vessel for receiving a flow of liquid having suspended matter therein;
  a plurality of partitions dividing the vessel into an inlet chamber, at least one gasification chamber and an outlet chamber, each of said chambers fluidly communicating with one another;
  means for introducing the flow of liquid into the inlet chamber;
  means for introducing a flow of gas into the at least one gasification chamber for creating a turbulent area and attracting the suspended matter and for carrying the suspended matter to an upper portion of the vessel;
  a primary skim collection channel extending through the at least one gasification chamber and into the inlet chamber for collecting the suspended matter in the upper portion of the vessel;

a secondary skim collection channel, independent of said primary channel, located in the upper portion of said outlet chamber for collecting the suspended matter in an upper portion of the outlet chamber, means to vertically adjust said secondary skim collection channel;

means for delivering the collected suspended matter outside of the vessel;

means for removing clarified liquid from said outlet chamber;

means for preventing a bypass by the gas and liquid of the turbulence area created by the flow of gas; and means for controlling the liquid level in the vessel mounted in the inlet chamber.

15. The apparatus of claim 14, further comprising means for reducing the velocity of a fluid flow in the outlet chamber, said means comprising a pair of spaced-apart baffle means extending upwardly from a bottom of the vessel and a means for recirculating a portion of the clarified liquid having an inlet which communicates with the outlet chamber, said inlet being positioned between said spaced-apart baffle means.

16. The apparatus of claim 14, wherein said liquid level control means comprises a displacement type level controller.

17. The apparatus of claim 16, further comprising means for controlling the skimming of the suspended matter intermittently at a pre-determined adjustable rate.

18. The apparatus of claim 17, wherein said means for controlling skimming at a pre-determined rate comprises an adjustable automatic timer operatively connected to said fluid level control means.

* * * * *